(12) United States Patent
Kurata

(10) Patent No.: US 7,985,069 B2
(45) Date of Patent: Jul. 26, 2011

(54) HEATING AND OIL-PRODUCING APPARATUS AND METHOD

(75) Inventor: Taishi Kurata, Kobe (JP)

(73) Assignee: Tapioca—Comercio E Servicos Sociedade Unipessoal LDA (PT)

( * ) Notice: Subject to any disclaimer, the term of this patent is extended or adjusted under 35 U.S.C. 154(b) by 942 days.

(21) Appl. No.: 11/919,320

(22) PCT Filed: Oct. 12, 2005

(86) PCT No.: PCT/JP2005/018753
§ 371 (c)(1),
(2), (4) Date: Oct. 26, 2007

(87) PCT Pub. No.: WO2006/117888
PCT Pub. Date: Nov. 9, 2006

(65) Prior Publication Data
US 2009/0305181 A1    Dec. 10, 2009

(30) Foreign Application Priority Data

Apr. 28, 2005  (JP) ................................ 2005-132715
Jul. 19, 2005  (JP) ................................ 2005-209081

(51) Int. Cl.
*F27B 15/00* (2006.01)
(52) U.S. Cl. ........................... 432/197; 432/214; 432/13
(58) Field of Classification Search ................ 122/16.1, 122/31.1, 33; 266/161, 162, 164, 171, 193; 432/29, 30, 69, 214, 215, 13, 197
See application file for complete search history.

(56) References Cited

U.S. PATENT DOCUMENTS

| | | | | |
|---|---|---|---|---|
| 2,865,734 A | * | 12/1958 | Klemantaski | 75/453 |
| 4,524,957 A | * | 6/1985 | Staffin et al. | 266/252 |
| 5,597,451 A | * | 1/1997 | Nagai et al. | 201/4 |
| 6,777,581 B1 | | 8/2004 | Zmuda | |
| 7,279,127 B2 | * | 10/2007 | Warner | 266/142 |
| 2002/0006367 A1 | | 1/2002 | Matsubara et al. | |

FOREIGN PATENT DOCUMENTS

| | | |
|---|---|---|
| JP | 11-323350 | 11/1999 |
| JP | 2001-72980 | 3/2001 |
| WO | 00/64998 | 11/2000 |
| WO | 2004/094561 A1 | 11/2004 |

* cited by examiner

*Primary Examiner* — Gregory A Wilson
(74) *Attorney, Agent, or Firm* — Gerald E. Hespos; Michael J. Porco

(57) ABSTRACT

It is aimed to improve the heating efficiency of a poured raw material by efficiently creating a natural convection in a container. The interior of a container is constructed to have such a closed loop shape that a heating medium can be vertically circulated. A heated gas passage includes a lower heating section for heating the heating medium in a lower storage, and a lateral heating section for heating the heating medium, which was heated in the lower storage, in a first lateral section. A raw material is introduced to the heating medium which is flowing toward the lower storage in a second lateral section by being heated in the first lateral section, thereby promoting the circulation of the heating medium. In heat transferring pipes, the raw material is boiled to create drive forces for circulating the heating medium.

15 Claims, 8 Drawing Sheets

United States Patent US 7,985,069 B2

HEATING AND OIL-PRODUCING APPARATUS AND METHOD

BACKGROUND OF THE INVENTION

1. Field of the Invention

The present invention relates to a heating and oil-producing apparatus, such as a melting furnace for producing oil from a raw material, and a heating and oil-producing method.

2. Description of the Related Art

A heating and oil-producing apparatus such as a melting furnace for heating a waste plastic or like raw material to product oil, for example, as disclosed in patent document 1, has been conventionally known. The apparatus disclosed in this patent document 1 is provided with a container 100 for storing a molten plastic that functions also as heat transferring oil as shown in FIG. 8, and a heating chamber 102 for heating the container 100 from below using a combustion gas from a burner 101 is disposed below the container 100. U-shaped heat transferring pipes 103 communicating with the heating chamber 102 are arranged in the container 100, and the combustion gas from the heating chamber 102 flows from a lower side toward an upper side in the heat transferring pipes 103. Thus, the molten plastic at the bottom of the container can be heated by the higher-temperature combustion gas flowing at the lower parts of the heat transferring pipes 103, thereby promoting a natural convection of heat transferring oil 105.
Patent Document 1: Japanese Unexamined Patent Publication No. H11-323350.

However, since the natural convection occurs only around the heat transferring pipes 103 in the conventional heating and oil-producing apparatus, the heat transferring oil 105 distant from the heat transferring pipes 103 is likely to stay still. Thus, there still remains a room for improvement in heating efficiency in the container 100 although the natural convection is created in part of the container 100.

SUMMARY OF THE INVENTION

In view of the above problem, an object of the present invention is to improve the heating efficiency of a poured raw material by efficiently creating a natural convection in a container.

In order to accomplish the above object, the present invention is directed to a heating and oil-producing apparatus for heating a raw material poured into a container containing a heating medium through a raw-material pouring portion by gas flowing in a heated gas passage to vaporize at least part of the raw material, characterized in that the interior of the container has a closed loop construction capable of vertically circulating the heating medium; the heated gas passage includes a lower heating section for heating the heating medium in a closed-loop lower part and a lateral heating section for heating the heating medium in a closed-loop lateral part having ascended by being heated in the closed-loop lower part; and the raw material is introduced to the heating medium flowing toward the closed-loop lower part by being heated in the closed-loop lateral part.

The present invention is also directed to a heating and oil-producing method comprising the steps of pouring a raw material into a container containing a heating medium, and heating the raw material by gas to vaporize at least a part of the raw material, characterized in that a container constructed to have such a closed loop shape that the heating medium can be vertically circulated is used; the heating medium is heated by the gas in the closed-loop lower part and the heating medium having ascended by being heated is further heated by the gas in the closed-loop lateral part; and the raw material is introduced while the heating medium heated in the closed-loop lateral part is flowing downward toward the closed-loop lower part.

According to the present invention, the interior of the container is constructed to have a closed-loop shape, and the heating medium is heated in the closed-loop lower part and the closed-loop lateral part, whereby the heating medium having ascended by being heated in the closed-loop lower part is further heated in the closed-loop lateral part. Thus, a natural convection for circulating the heating medium can be created in the entire container. Hence, not only the heating medium around the heated gas passage, but also all the heating medium in the container flows, therefore the heating efficiency of the heating medium in the container can be improved and that of the raw material flowing together with the heating medium can also be improved as compared to a construction in which a natural convection of the heating medium is created in only part of the container. Further, since the raw material is introduced to the heating medium having reached a high temperature by being heated in the closed-loop lateral portion, the raw material can be efficiently and quickly heated. Furthermore, since all the heating medium in the container flows, the raw material is easier to agitate, thereby suppressing the excessive heating of portions to be directly heated by the gas in the heated gas passage and suppressing the carbonization of components contained in the raw material to adhere to the inner surface of the container and the like. Therefore, there is an advantage of reducing the maintenance frequency of removing carbons.

As described above, according to the present invention, a natural convection can be efficiently created in the container and the heating efficiency of the poured raw material can be improved.

DETAILED DESCRIPTION OF THE PREFERRED EMBODIMENTS

Hereinafter, best modes for embodying the present invention are described in detail with reference to the accompanying drawings.

First Embodiment

Figure 1:
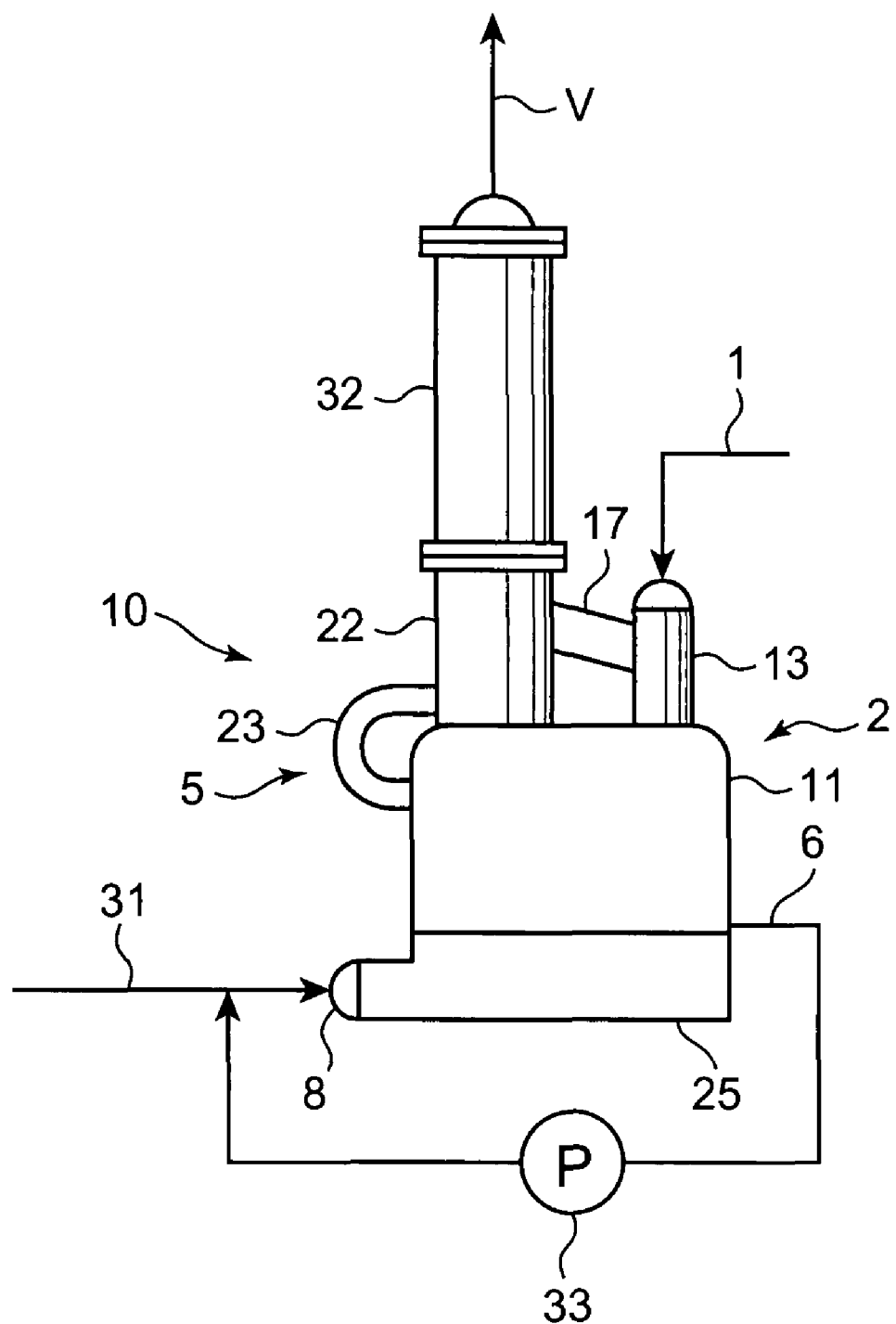
FIG. 1 is a schematic diagram showing an external appearance of a heating furnace according to a first embodiment of the invention.

FIG. 1 is a diagram schematically showing a heating furnace 10 as one embodiment of a heating and oil-producing apparatus according to the present invention. This heating furnace 10 is adapted, for example, to extract light-oil components by heating heavy oil such as crude oil poured into as a raw material 1, and can be used as a heating furnace of a petroleum refining apparatus or as a heating furnace of a fractionating/refining apparatus. As shown in FIG. 1, the heating furnace 10 includes a container 2 made of a stainless steel. A heating medium 7 such as light oil or kerosene is stored in this container 2.

The container 2 has a closed loop inner construction. This construction is described in detail below. The container 2 is provided at its bottom with a lower storage 11 having a relatively large inner volume. This lower storage 11 constructs a lower part of the closed loop and corresponds to a closed loop lower part according to the present invention.

Figure 2:
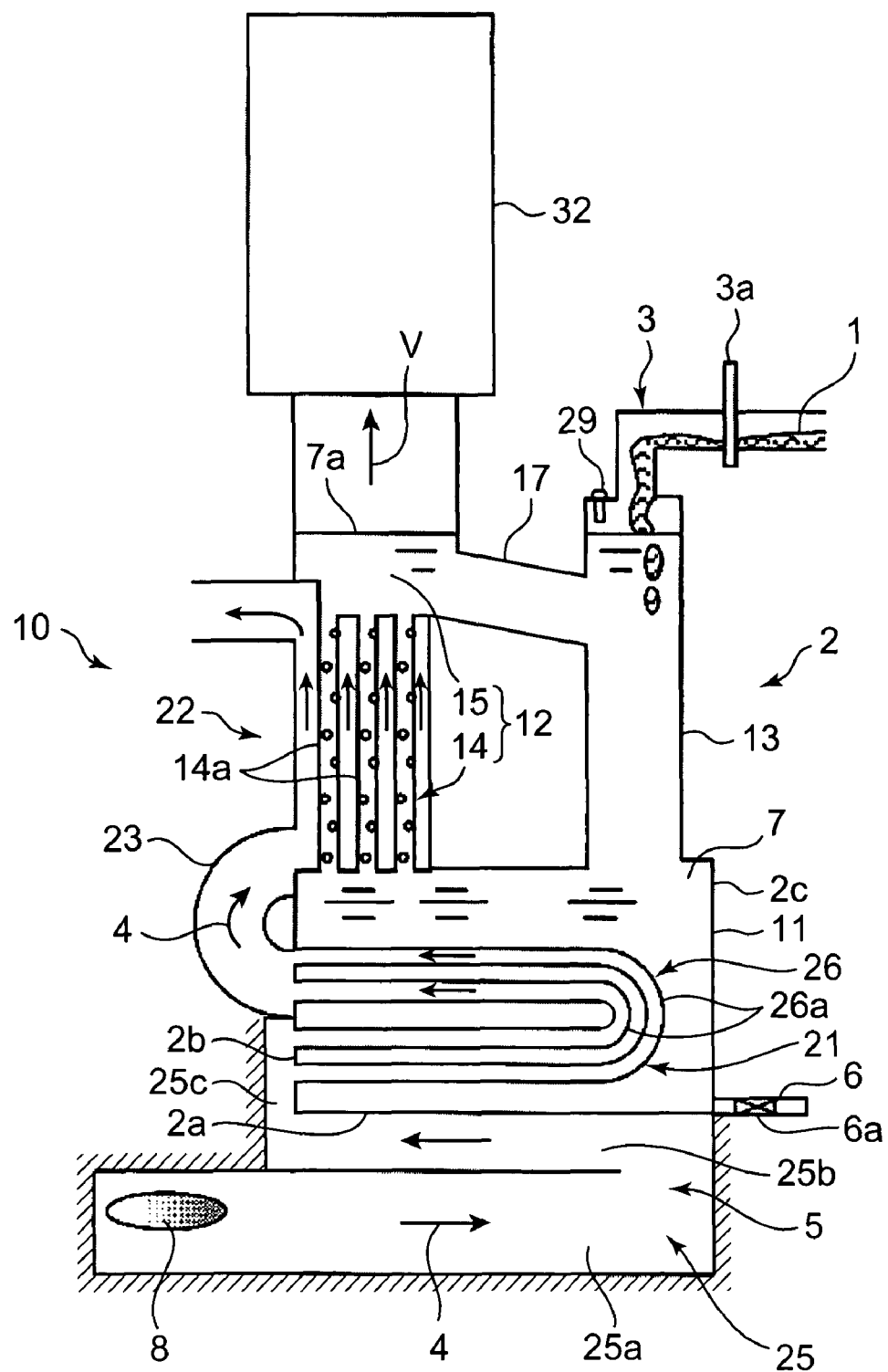
FIG. 2 is a diagram schematically showing an internal construction of the heating furnace.

As schematically shown in FIG. 2, the lower storage 11 is provide with a first lateral section 12 extending upward from one end (left side in FIG. 2) of the upper surface of the lower storage 11 and a second lateral section 13 extending upward from the other end (right side in FIG. 2) of the upper surface of the lower storage 11. The first lateral section 12 is comprised of a heat transferring pipe assembly 14 including a multitude of heat transferring pipes 14a, which are thin pipes, and a joining section 15 provided at the upper end of the heat transferring pipe assembly 14.

The heat transferring pipe assembly 14 has the bottom end thereof connected with the upper surface of the lower storage 11, and the respective heat transferring pipes 14a are arranged to vertically extend. The respective heat transferring pipes 14a communicate with the lower storage 11 through communication holes formed in the upper surface of the lower storage 11. The joining section 15 is formed to straddle all the heat transferring pipes 14a, and the heating media flowing out from the upper ends of the respective heat transferring pipes 14a join in this joining section 15. A closed loop lateral part according to the present invention is formed by the heat transferring pipe assembly 14 and the joining section 15. In other words, the heat transferring pipe assembly 14 and the joining section 15 construct one lateral part of the closed loop.

On the other hand, the second lateral section 13 is formed to have, for example, a cylindrical shape and is hollow. An upper storage 17 stretches between the second lateral section 13 and the joining section 15 while being distanced upward from the lower storage 11. A space encircled by the lower storage 11, the first lateral section 12, the second lateral section 13 and the upper storage 17 serves as a penetrating space penetrating the container 2 in the depth direction of the plane of FIG. 2. The upper storage 17 is formed to have, for example, a cylindrical shape inclined slightly down from the first lateral section 12 toward the second lateral section 13. This upper storage 17 serves as an upper part of the closed loop.

The joining section 15 and the second lateral section 13 communicate with each other via the upper storage 17. The second lateral section communicates with the lower storage 11 through a communication hole formed in the upper surface of the lower storage 11. In this way, the interior of the container 2 is formed into the closed loop in which the lower storage 11, the first lateral section 12, the second lateral section 13 and the upper storage 17 communicate, so that the heating medium 7 can be convected upward and downward in the container 2. In other words, the entire interior of the container 2 serves as a closed circuit, which is a circulation path of a heat convection. In this embodiment, a circulating part according to the present invention is constructed by the upper storage 17 and the second lateral section 13. Specifically, the heating medium 7 flowing out from the first lateral section 12 flows toward the lower storage 11 via the upper storage 17 and the second lateral section 13. In the container 2, the lower storage 11, the first lateral section 12, the second lateral section 13 and the upper storage 17 are integrally constructed in this way, and the heating medium 7 can be stored in all of the lower storage 11, the first lateral section 12, the second lateral section 13 and the upper storage 17.

A raw-material pouring portion 3 for pouring the raw material 1 into the container 2 is disposed at the upper end of the second lateral section 13. This raw-material pouring portion 3 is connected with the second lateral section 13 so that the raw material 1 can flow down from above. Thus, the poured raw material flows down to be directly supplied to the heating medium 7 in the second lateral section 13.

A gate valve 3a is provided in the raw-material pouring portion 3. This gate valve 3a is adapted for adjusting the amount of the raw material 1 supplied from a raw-material tank (not shown) by means of an unillustrated pump or the like to be poured into the container 2. By adjusting a degree of opening of the gate valve 3a, the amount of the raw material 1 stored in the entire container 2 can be adjusted. The raw-material pouring portion 3 may be a hopper so as to supply the raw material 1 into the container 2 by letting the raw material 1 gravitationally flow down.

The heating furnace 10 of this embodiment is provided with a heated gas passage 5 for passing gas 4 for heating the heating medium 7 in the container 2. This heated gas passage 5 is comprised of a lower heating section 21, a lateral heating section 22 and a communicating section 23 communicating the two heating sections 21, 22.

The lower heating section 21 is adapted for heating the heating medium 7 in the lower storage 11 and includes an outer heating section 25 arranged outside the container 2 and an inner heating section 26 arranged inside the container 2. The outer heating section 25 is comprised of an introducing portion 25a having a burner 8 provided at an end thereof and extending substantially horizontally, a bottom-surface heating portion 25b extending substantially horizontally along a bottom surface 2a of the container 2, and a communicating portion 25c communicated with the downstream end of the bottom-surface heating portion 25b and extending upward along a side wall 2b of the lower storage 11. The outer wall of the outer heating section 25 is made of a refractory heat-insulating material, so that the heat of the gas 4 flowing in the outer heating section 25 does not leak outside. As a fuel for the burner 8, a heavy-oil fuel such as inexpensive heavy oil can be used.

The gas 4 is produced by the combustion of the burner 8 and flows along the introducing portion 25a, the bottom-surface heating portion 25b and the communicating portion 25c in this order. At this time, the heat of the gas 4 in the bottom-surface heating portion 25b is transferred to the heating medium 7 in the lower storage 11 via the bottom surface 2a of the container 2. In other words, the bottom surface 2a of the container 2 serves as a heat-transferring surface for transferring the heat of the gas 4 to the heating medium 7.

The inner heating section 26 is arranged in the lower storage 11, and includes a plurality of U-shaped pipes 26a. The respective U-shaped pipes 26a are fixedly attached to the side wall 2b at one side (left side in FIG. 2) of the lower storage 11 such that the both ends thereof are vertically arranged, and horizontally extend from the side wall 2b toward a side wall 2c at the opposite side. Curved portions of the U-shaped pipes 26a are located in the vicinity of the opposite side wall 2c. By arranging the curved portions away from the container side wall 2c in this way, the action of thermal stresses on the U-shaped pipes 26a resulting from the thermal expansion of the U-shaped pipes 26a can be suppressed.

The lower ends of the U-shaped pipes 26a communicate with the communicating portion 25c via communication holes formed in the container side wall 2b. On the other hand, the upper ends of the U-shaped pipes 26a communicate with the communicating section 23 via communication holes formed in the container side wall 2b. This communicating section 23 communicates with the U-shaped pipes 26a at its bottom end, and is arranged outside the container 2. The upper end of the communicating section 23 communicates with the bottom end of the lateral heating section 22. Although not shown, the communicating section 23 is covered by a heat-insulating material.

The lateral heating section 22 is adapted for heating the heating medium in the first lateral section 12, arranged to surround the heat transferring pipe assembly 14, and constructed, for example, by a hollow cylindrical member extending upward from the bottom end of the first lateral section 12 along the first lateral section 12. The bottom end of the lateral heating section 22 communicates with the communicating section 23. In other words, in the lateral heating section 22, the heating medium 7 in the heat transferring pipe assembly 14 is heated by the gas 4 flowing upward outside the heat transferring pipes 14a.

A liquid level sensor 29 as one example of liquid level detecting means for detecting a liquid level 7a of the stored heating medium 7 is provided in the container 2. This liquid level sensor 29 is disposed, for example, at the upper end of the second lateral section 13 for controlling the amount of heat and the amount of the poured raw material 1 such that an amount of the heating medium in the container 2 lies within such a specified range as to create a normal circulation.

The container 2 is also provided with a discharging pipe 6 for discharging components residual in the container 2. This discharging pipe 6 is provided at the bottom end of the lower storage 11 and used to discharge heavy-oil components remaining at the bottom of the container 2 after being fractionated from the raw material 1. Specifically, since the heavy-oil components in the raw material 1 have high boiling points and are difficult to vaporize, a ratio of the heavy-oil components increases with the operating time of this apparatus, with the result that the heavy-oil components come to remain at the bottommost of the lower storage 11. This ratio increases to cause the formation of carbons if the heavy-oil components are left. Thus, the ratio of the heavy-oil components in the raw material 1 is kept at a constant level by discharging the heavy-oil components through the discharging pipe 6. The discharged raw material 1 may be stored in an unillustrated storage tank or may be used as a fuel. More specifically, the heavy-oil components can be used as the fuel by providing a valve 6a in the discharging pipe 6, connecting the discharging pipe 6 with a fuel supplying path 31 for the burner 8, and providing a pump 33 in this connecting path as shown in FIG. 1.

A catalyst tank 32 is provided above the first lateral section 12. This catalyst tank 32 is adapted for modifying and refining oily substances having vaporized in the container 2. In place of the catalyst tank 32, a fractionating column may be installed above the first lateral section 12.

Figure 3:
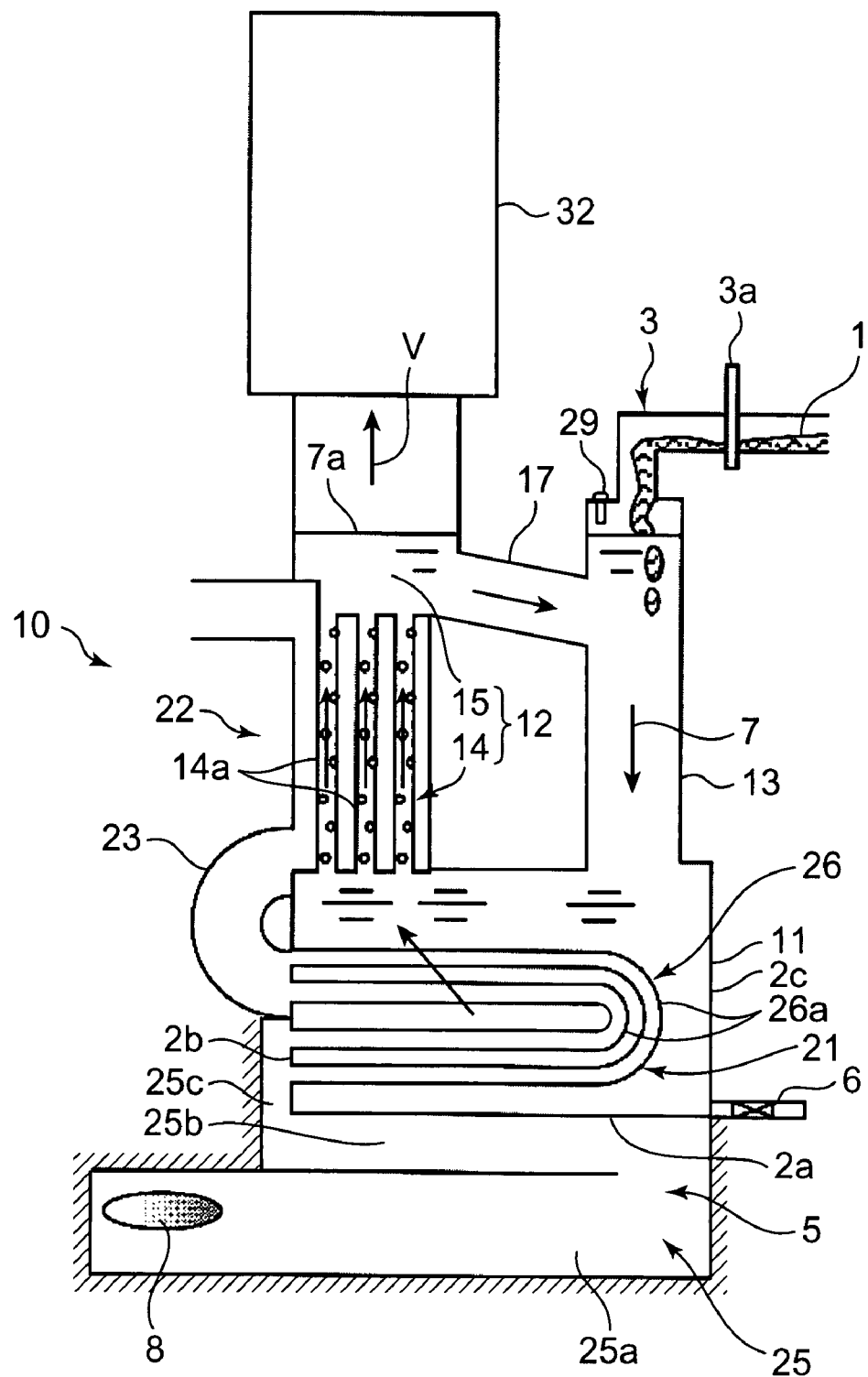
FIG. 3 is a diagram showing a flowing direction of a heating medium in the heating furnace.

Next, the operation of this heating furnace 10 is described with reference to FIGS. 2 and 3. Arrows shown in FIG. 2 indicate the flow of the gas 4, whereas arrows shown in FIG. 3 indicate the flows of the heating medium 7 and the raw material 1.

First, at an initial stage of the operation, the heating medium 7 such as light oil or kerosene is supplied into the container 2, and the interior of the container 2 is heated by the gas 4 of, e.g. 700 to 800° C. produced through combustion by means of the burner 8. Specifically, the combustion gas 4 of the burner 8 heats the container bottom surface 2a in the bottom-surface heating portion 25b after flowing through the introducing portion 25a, and flows into the inner heating section 26 through the communicating portion 25c. In the inner heating section 26, the combustion gas 4 heats the heating medium 7 in the lower storage 11 and flows into the lateral heating section 22 through the communicating section 23. In the lateral heating section 22, the combustion gas 4 heats the heating medium 7 in the first lateral section 12 and then the combustion gas 4 is discharged.

On the other hand, in the container 2, the heating medium 7 heated in the lower storage 11 by the combustion gas 4 ascends and flows into the respective heat transferring pipes 14a of the heat transferring pipe assembly 14. This heating medium 7 is heated to such an extent that a part thereof boils in the heat transferring pipes 14a. Thus, the heating medium 7 becomes a fluid in the form of a gas-liquid mixture having a low average density as a whole to create a strong upward flow. As a result, a circulating flow in which the heating medium 7 circulates from the lower storage 11 to the first lateral section 12, to the upper storage 17, and to the second lateral section 13 in this order is created in the container 2. This heating medium 7 is heated, for example, to about 350° C.

Subsequently, if the liquid level 7a detected by the liquid level sensor 29 has not reached a specified level yet, the gate valve 3a is opened to pour the raw material 1 from the raw-material pouring portion 3. The raw material 1 may be heavy oil such as crude oil.

This raw material 1 directly flows down from the raw-material pouring portion 3 to be mixed with the heating medium 7 in the second lateral section 13. Since the heating medium 7 heated in the heat transferring pipe assembly 14 flows into the second lateral section 13 and the heating medium 7 having reached a particularly high temperature in the container 2 flows in the second lateral section 13, the poured raw material 1 is efficiently heated. Accordingly, the raw material 1 having a high viscosity becomes more fluid by easily receiving heat, therefore a suppression of the natural convection by the pouring of the raw material 1 can be prevented. Further, since the raw material 1 having a lower temperature is mixed with the heating medium 7 at this time, the specific gravity of the heating medium 7 increases, thereby accelerating the downward flow in the second lateral section 13. Specifically, the natural convection of a mixed fluid of the heating medium 7 and the raw material 1 in the container 2 is promoted by the downward flow in the second lateral section 13 in addition to by the upward flow in the heat transferring pipe assembly 14. Thus, the raw material 1 flowing together with the heating medium 7 can be efficiently heated in the lower storage 11 and the first lateral section 12. Vapors V produced in the container 2 are introduced to the catalyst tank 32 to be modified.

As described above, according to the heating furnace 10 of the first embodiment, the container 2 has a closed loop inner construction, and the heating medium 7 is heated in the lower storage 11 and the first lateral section 12. Accordingly, the heating medium 7 can be further heated in the first lateral section 12 after being heated in the lower storage 11 and ascending. This enables a strong natural convection of circulating the heating medium 7 in the entire container 2 to be created. Thus, not only the heating medium 7 around the heated gas passage 5, but also the entire heating medium 7 in the container 2 flows, therefore the heating efficiency of the heating medium 7 in the container 2 and the heating efficiency of the raw material 1 flowing together with this heating medium 7 can be improved as compared to a construction in which a natural convection of the heating medium 7 is created in only the partial interior of the container 2. Further, since the raw material 1 is brought to the heating medium 7 heated to a high temperature in the first lateral section 12, the raw material 1 can be efficiently and quickly heated. Since the heating efficiency of the raw material 1 is thus improved in this heating furnace 10, the heating furnace 10 is effectively applied, for example, to a petroleum refining apparatus or the like required to process a huge amount of crude oil.

Further, since the entire heating medium flows in the container 2, it can be made easily possible to create a high-speed circulating flow and to agitate the raw material 1, whereby the overheating of the partial interior directly heated by the gas 4 in the heated gas passage 5 can be suppressed and the carbonization of components contained in the raw material 1 to adhere to the inner surface of the container 2 and the like can be suppressed. Accordingly, there are advantages of being able to suppress the deterioration of the heat transferring property due to the adhesion of particulate carbons such as C2 and C3 and to reduce a maintenance frequency of removing the adhered carbons.

Since the raw-material pouring portion 3 is installed at the upper end of the second lateral section 13 in the first embodiment, the raw material 1 can be supplied to the heating medium 7 flowing in the second lateral section 13 from the upper storage 17 toward the lower storage 11. Thus, the natural convection of the heating medium 7 in the closed loop can be promoted by the supplied raw material 1. Specifically, since the specific gravity of the heating medium 7 increases by mixing the raw material having a lower temperature than the heating medium 7, the downward flow of the heating medium 7 in the second lateral section 13 can be promoted by the pouring of the raw material. As a result, the natural circulation of the heating medium 7 in the entire container 2 can be promoted to further improve the heating efficiency of the raw material 1.

Since the inner heating section 26 is constructed by a plurality of U-shaped pipes 26a having the opposite ends thereof fixedly attached to the one lateral wall 2b of the container 2 in the first embodiment, thermal stresses acting between the U-shaped pipes 26a and the container 2 resulting from the thermal expansion of the U-shaped pipes 26a can be suppressed even if the U-shaped pipes 26a and the container 2 are made of materials having different thermal expansion coefficients. Therefore, restriction on the materials for the container 2 and the U-shaped pipes 26a can be alleviated.

Further, since the heat transferring pipe assembly 14 including a multitude of heat transferring pipes 14a is provided in the first lateral section 12 in the first embodiment, upward flows can be smoothly created in the heat transferring pipes 14a by boiling the raw material 1 in the heat transferring pipes 14a to create gas-liquid two-phase flows. In this way, drive forces for circulation can be efficiently obtained in the heat transferring pipe assembly 14 while ensuring a heat transferring area in the lower storage 11 having a relatively large volume. Particularly in this embodiment, since the heat transferring pipe assembly 14 is an assembly of narrow pipes, the heat transferring area can be increased and the heat transferring efficiency can be improved in this respect as well.

Furthermore, since the liquid level sensor 29 is provided in the first embodiment, it is possible to execute such a control that the liquid level 7a lies within a specified range, thereby being able to prevent the spillover of the heating medium 7. This can also prevent the heat transferring pipe assembly 14 and the like from being exposed and excessively heated because of too small the amount of the raw material 1.

Further, since the remaining components can be discharged to the outside via the discharging pipe 6 in the first embodiment, heavy-oil components that could not vaporize can be removed.

Furthermore, since the amount of the poured raw material 1 can be controlled by providing the gate valve 3a at a side upstream of the raw-material pouring portion 3, the amount of oil in the entire furnace can be controlled.

The material of the container 2 is not limited to the stainless steel, and various changes can be made in the shape and material thereof.

Further, the combustion gas 4 is not limited to the one obtained by combusting the heavy oil such as heavy oil, and may be the one obtained by combusting another fuel such as natural gas.

The features of the first embodiment are as follows.

(1) The interior of the container is constructed to have a closed-loop shape by the closed-loop lower part, the closed-loop lateral part, and the circulating part communicating the closed-loop lateral part and the closed-loop lower part without touching the heated gas passage.

(2) The raw-material pouring portion is disposed above the circulating part. Accordingly, the raw material is supplied to the heating medium flowing toward the closed-loop lower part in the circulating part by being let to flow down. Thus, the natural convection of the heating medium in the closed loop can be promoted by the supplied raw material. Specifically, since the specific gravity of the heating medium increases by mixing the raw material having a lower temperature than the heating medium, the downward flow of the heating medium in the circulating part can be promoted by the pouring of the raw material. As a result, the natural circulation of the heating medium in the entire container can be promoted, thereby further improving the heating efficiency of the raw material.

(3) The lower heating section is provided with the U-shaped pipes arranged in the closed-loop lower part, wherein one end of each U-shaped pipe penetrates the side wall of the container so that the above gas flows thereinto and the other end thereof penetrates the above side wall to be connected with the lateral heating section. Accordingly, thermal stresses acting between the U-shaped pipes and the container resulting from the thermal expansion of the U-shaped pipes can be suppressed even if the U-shaped pipes and the container are made of materials having different thermal expansion coefficients. Therefore, restriction on the materials for the container and the U-shaped pipes can be alleviated.

(4) The closed-loop lateral part is provided with a plurality of heat transferring pipes and the heating medium heated in the closed-loop lower part flows into the respective heat transferring pipes. Accordingly, the heating medium heated in the closed-loop lower part is caused to flow into the respective heat transferring pipes in the closed-loop lateral part and is further heated in the heat transferring pipes. Therefore, upward flows can be smoothly created in the heat transferring pipes by boiling the raw material in the heat transferring pipes to create the gas-liquid two-phase flows.

(5) The raw material includes crude oil. Accordingly, the present invention is applicable to a crude oil heating apparatus such as a petroleum refining apparatus required, for example, to process a huge amount of crude oil.

(6) At least either one of the catalyst tank for reacting the raw material having vaporized in the container and the fractionating column for fractionating the raw material having vaporized in the container is connected with the upper end of the closed-loop lateral part. Accordingly, it is possible, for example, to modify vaporized components.

(7) The liquid level detecting means is provided to detect the liquid level of the heating medium. Accordingly, the liquid level can be so controlled as to lie within a specified range since the liquid level of the heating medium can be detected.

(8) The discharging pipe is provided to discharge components remaining in the container. Accordingly, the heavy-oil components and the like that could not be vaporized can be removed since the remaining components can be discharged to the outside via the discharging pipe.

Second Embodiment

Figure 4:
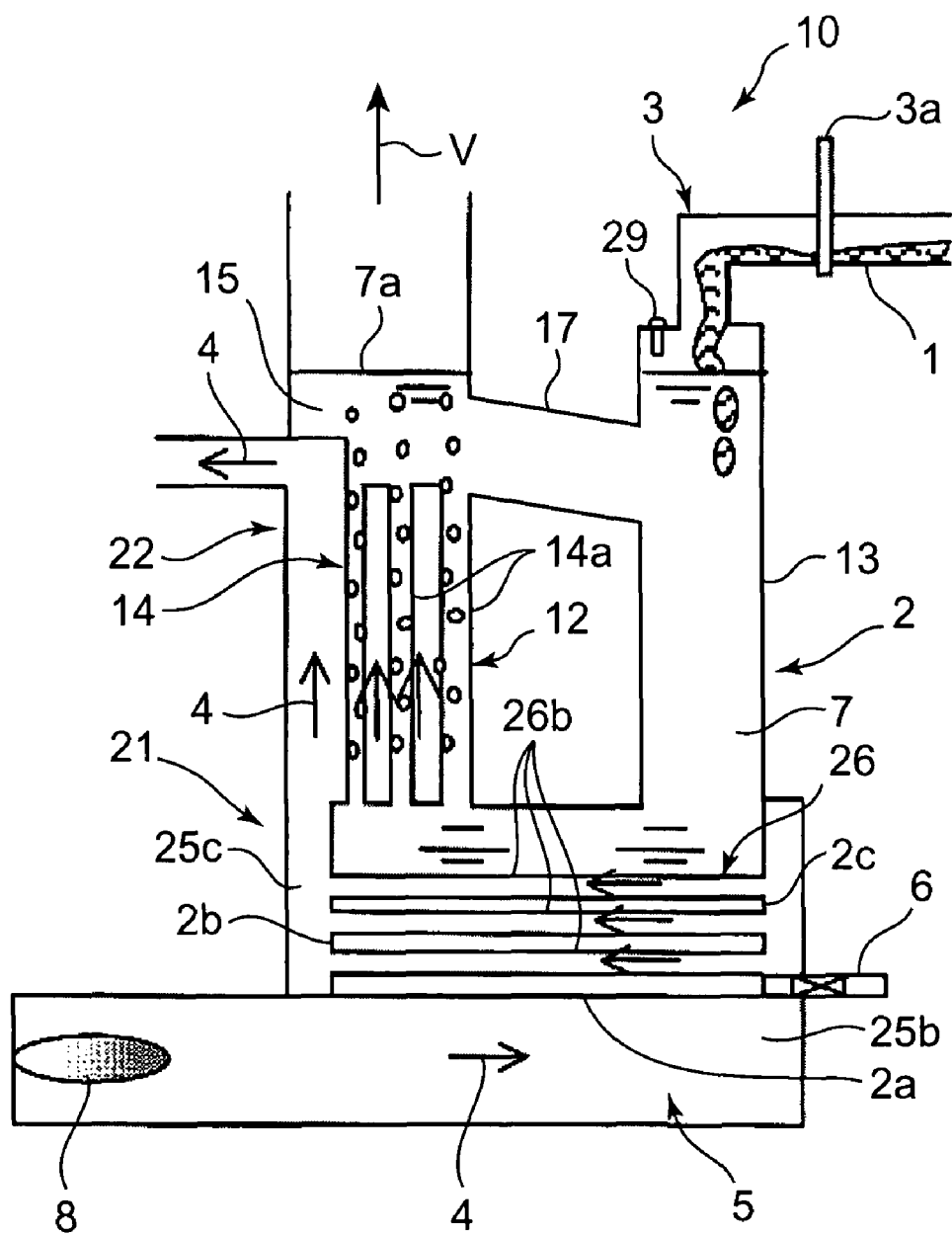
FIG. 4 is a diagram, corresponding to FIG. 2, schematically showing an internal construction of a heating furnace according to a second embodiment of the invention.
Figure 5:
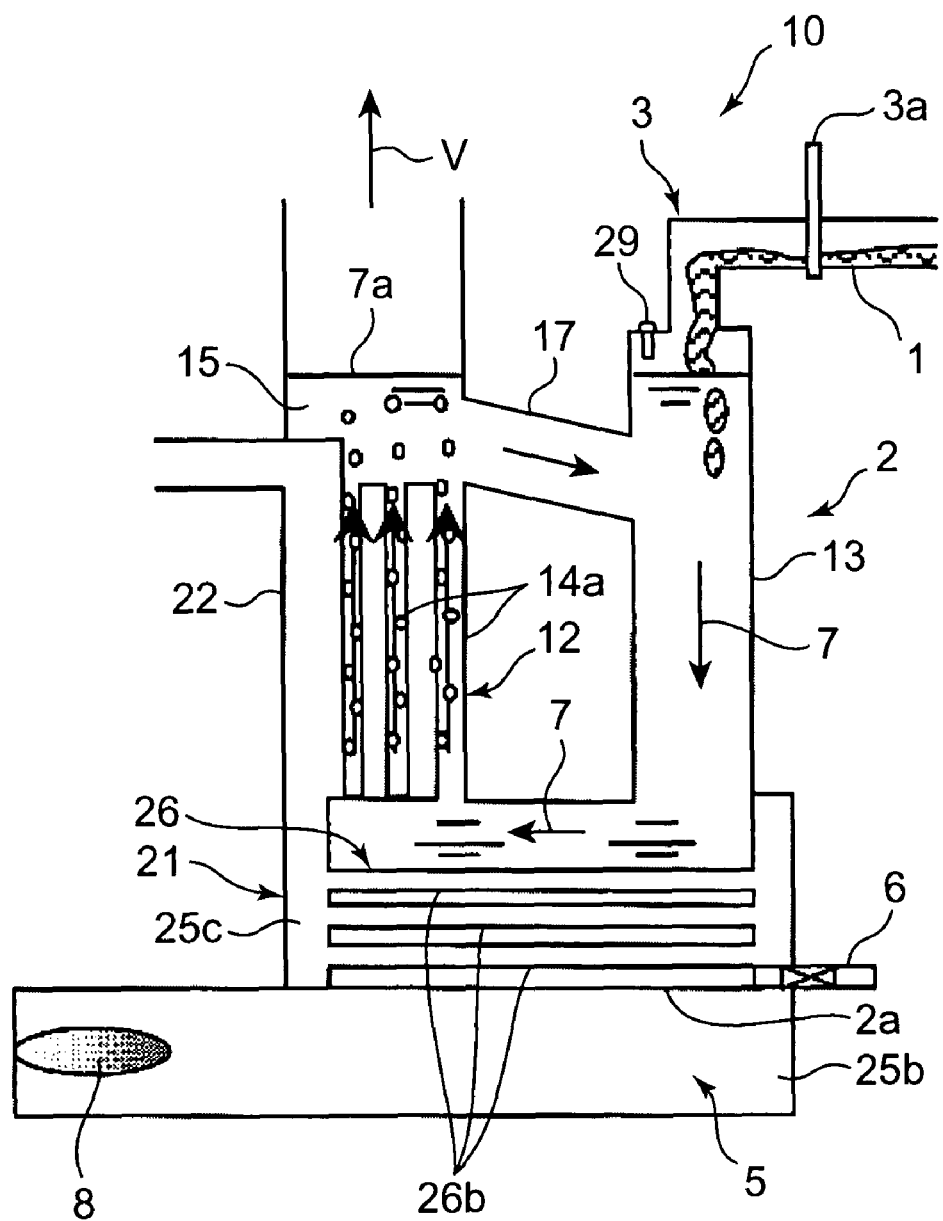
FIG. 5 is a diagram showing a flowing direction of a heating medium in the heating furnace.

FIGS. 4 and 5 schematically show a heating furnace 10 according to a second embodiment. It should be noted that arrows indicate the flow of combustion gas 4 in FIG. 4 and arrows indicate flowing directions of a heating medium 7 and a raw material 1 in FIG. 5.

Although the inner heating section 26 includes a plurality of U-shaped pipes 26a in the first embodiment, it includes a plurality of straight heat transferring pipes 26b in the second embodiment. In other words, the inner heating section 26 is an assembly of thin pipes. Since the other construction is similar to that of the first embodiment, no description is given on the same elements by identifying them by the same reference numerals.

The respective heat transferring pipes 26b are arranged to horizontally extend between opposing side walls 2b, 2c. One end (right end in FIG. 4) of each heat transferring pipe 26b communicates with a bottom-surface heating portion 25b, whereas the other end communicates with a communicating portion 25c. This communicating portion 25c vertically extends along the side wall 2b of a lower part of a container 2, and the upper end thereof communicates with a lateral heating section 22.

In this heating furnace 10, the combustion gas 4 of a burner 8 flows in the bottom-surface heating portion 25b to heat a bottom surface 2a of a lower storage 11 and, thereafter, flows in horizontal direction along the respective heat transferring pipes 26b. This combustion gas 4 heats the heating medium 7 and the raw material 1 in a first lateral section 12 in the lateral heating section 22 after heating the heating medium 7 and the raw material 1 in the lower storage 11. This creates a natural circulation of the heating medium 7 and the raw material 1 in the entire container 2, whereby the raw material 1 can be efficiently vaporized.

According to the second embodiment, various pipe members commercially available can be utilized for the inner heating section 26, and the heat transferring area of the lower heating section 21 can be increased in a limited space. Thus, the heating efficiency can be improved while suppressing an increase in the parts cost.

Features of the second embodiment are as follows.

(1) The lower heating section is provided with a plurality of heat transferring pipes arranged in the closed-loop lower part, wherein one end of each heat transferring pipe penetrates the side wall of the container so that the gas flows thereinto and the other end thereof penetrates the side opposite to the above side wall to be connected with the lateral heating section. Accordingly, various pipe members commercially available can be utilized, and the heat transferring area of the lower heating section can be increased in a limited space. Thus, the heating efficiency can be improved while suppressing an increase in the parts cost.

The other construction, functions and effects are similar to those of the first embodiment.

Third Embodiment

Figure 6:
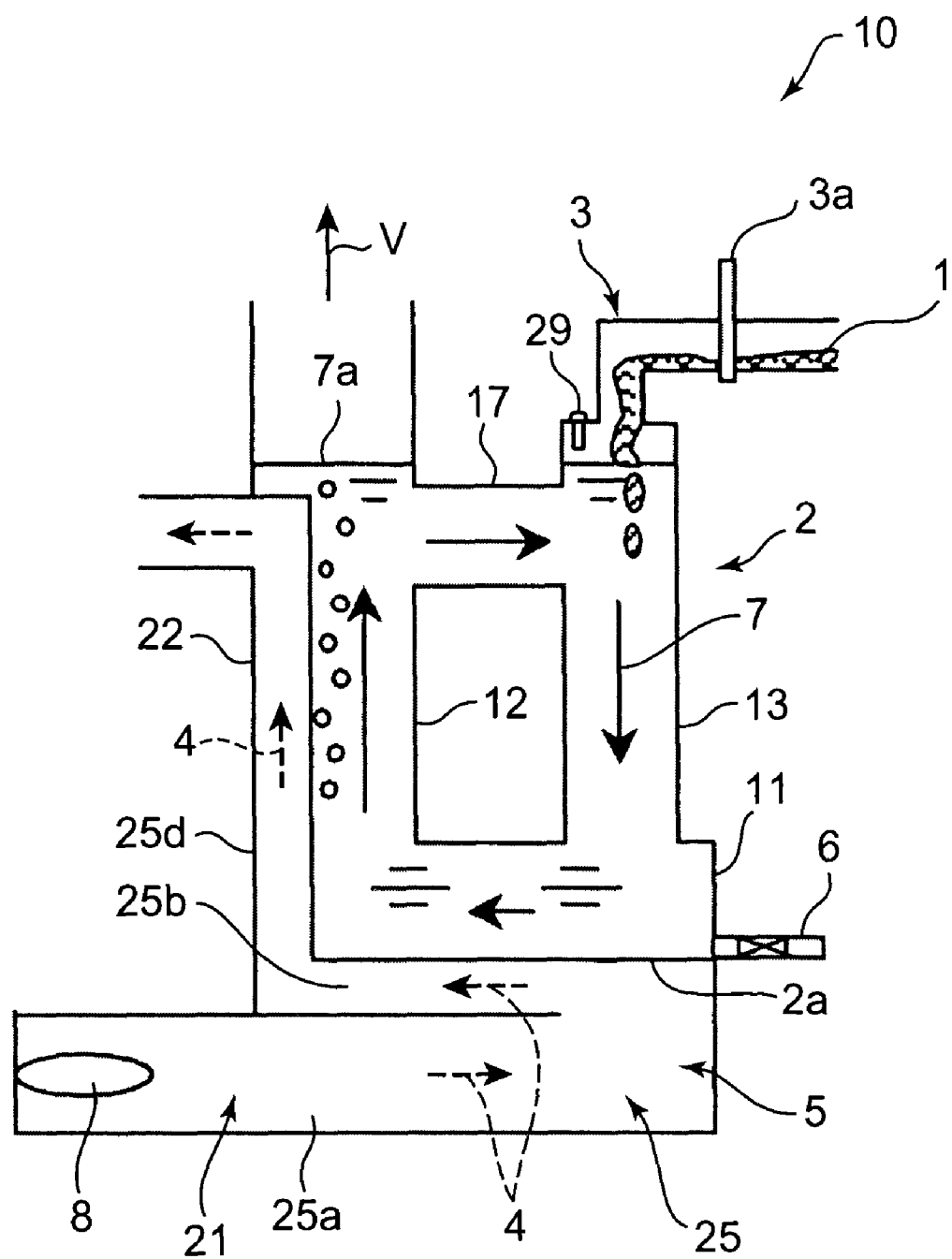
FIG. 6 is a diagram, corresponding to FIG. 2, schematically showing an internal construction of a heating furnace according to a third embodiment of the invention.

FIG. 6 schematically shows a heating furnace 10 according to a third embodiment. In this embodiment, the constructions of a lower heating section 21 and a lateral heating section 22 are simplified as compared to the first and second embodiments.

Specifically, the lower heating section 21 includes only an outer heating section 25 without including any inner heating section. The lower heating section 21 includes an introducing portion 25a, a bottom-surface heating portion 25b, and a lower-side-surface heating portion 25d. Accordingly, a lower storage 11 is heated only from the outside of the container 2 in the third embodiment.

The lateral heating section 22 communicates with the lower-side-surface heating portion 25d at its bottom end, and extends upward along a first lateral section 12 from this communicating bottom end.

The first lateral section 12 is constructed, for example, by a hollow cylindrical member connected with the upper surface of the lower storage 11 and extending vertically. Since no heat transferring pipes are provided in the first lateral section 12, a heating medium 7 and a raw material 1 flow without being divided in the first lateral section 12. Accordingly, the flow resistances of the heating medium 7 and the raw material 1 can be reduced as compared to the foregoing embodiments.

Since a natural circulation of the heating medium 7 and the raw material 1 can be created in the entire container 2 in the third embodiment as well, the raw material 1 can be efficiently vaporized.

The other construction, functions and effects are similar to those of the first embodiment.

Fourth Embodiment

Figure 7:
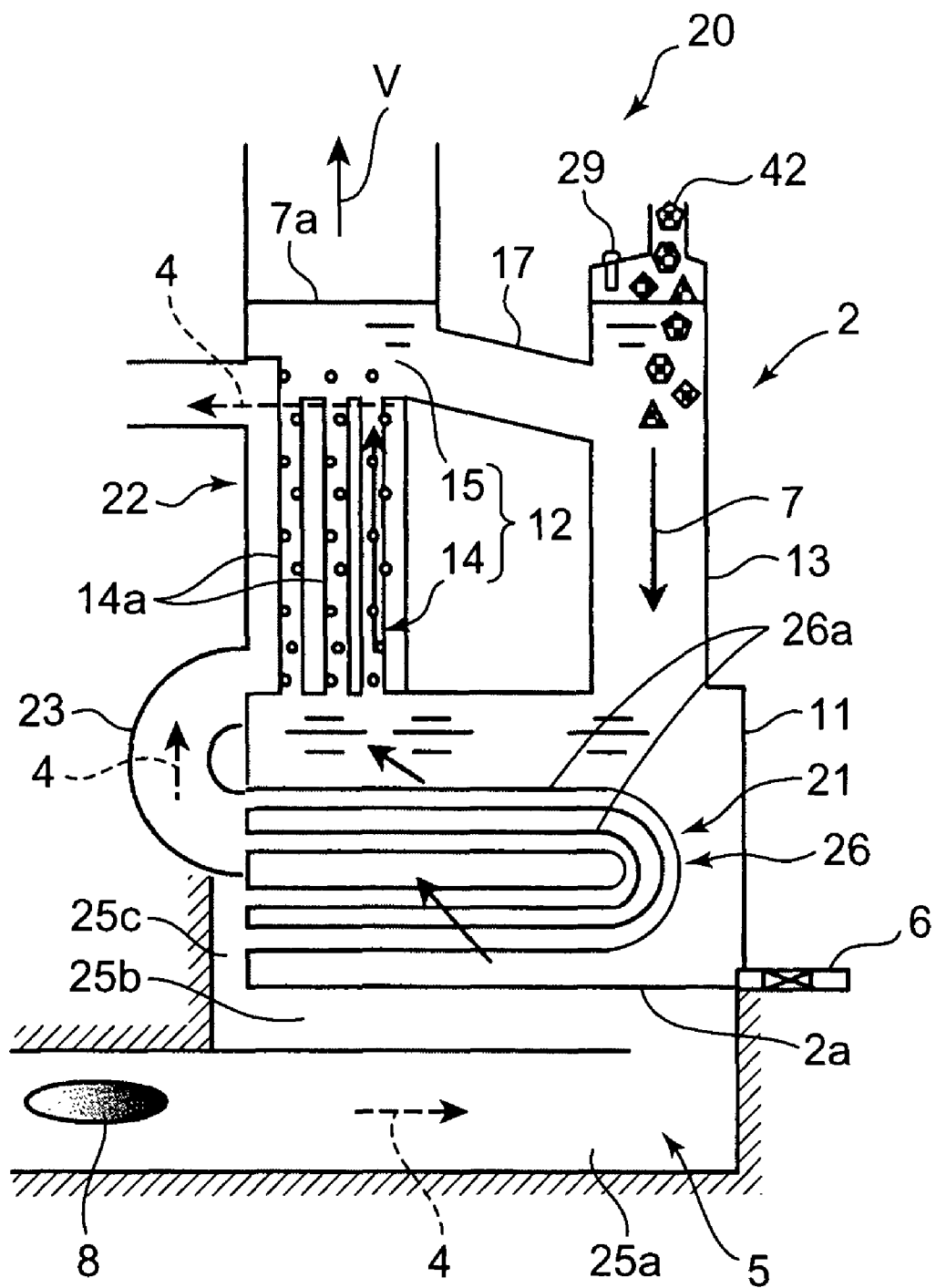
FIG. 7 is a diagram, corresponding to FIG. 2, schematically showing an internal construction of a heating furnace according to a fourth embodiment of the invention.
Figure 8:
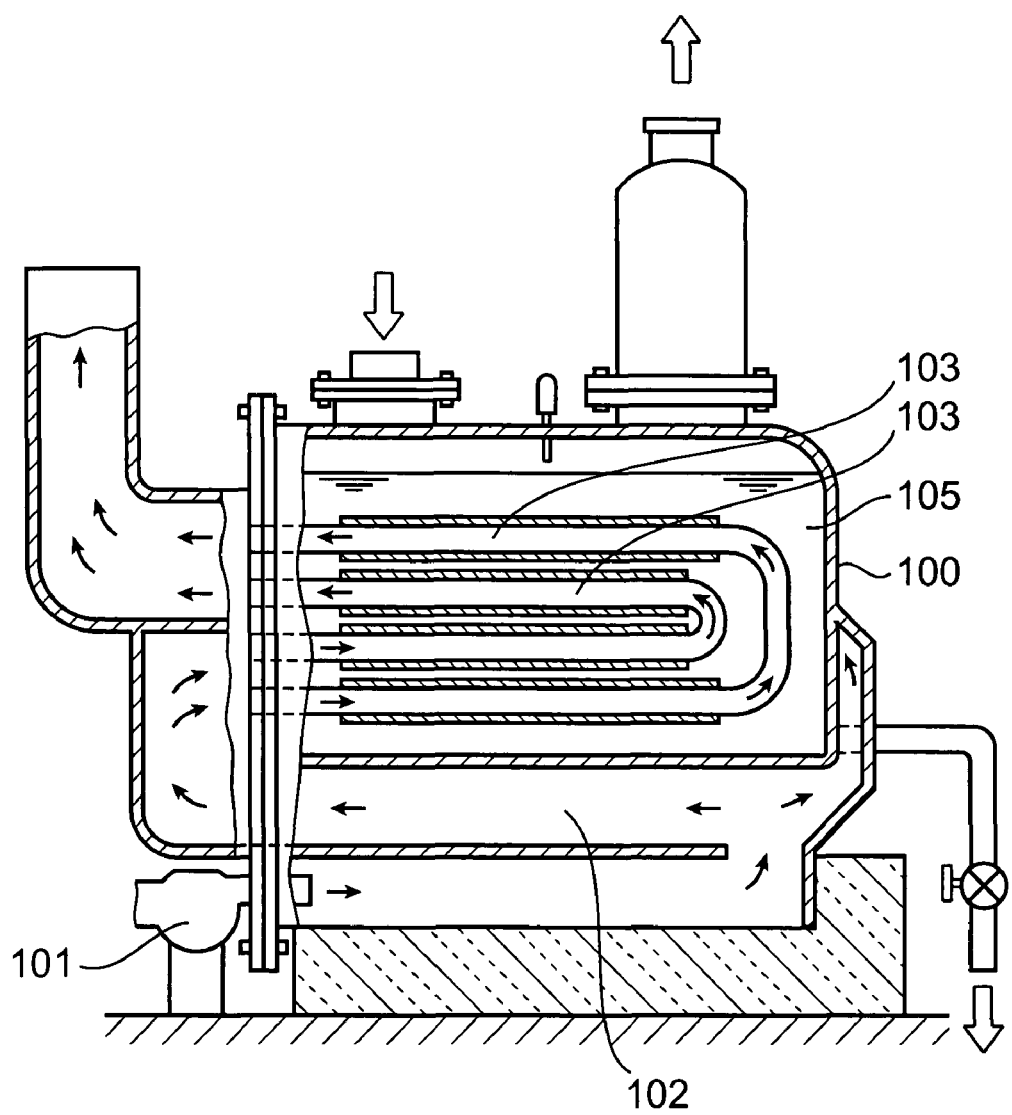
FIG. 8 is a diagram showing an internal construction of a conventional heating and oil-producing apparatus.

FIG. 7 schematically shows a melting furnace 20 according to one embodiment of the heating and oil-producing apparatus according to the present invention. This melting furnace 20 is adapted for producing oil by melting solid components such as waste plastic poured as a raw material.

The construction of this melting furnace 20 is basically the same as that of the heating furnace 10 according to the first embodiment. Specifically, a container 2 is provided with a lower storage 11, a first lateral section 12, an upper storage 17 and a second lateral section 13 and has a closed loop inner construction. A heated gas passage 5 along which gas 4 for heating a heating medium 7 and a raw material 1 in the container 2 flows is comprised of a lower heating section 21, a lateral heating section 22, and a communicating section 23 communicating both heating sections 21, 22.

The fourth embodiment differs from the first to third embodiments on that solid components are contained in the raw material and molten in the container 2. Kinds of plastics shown in TABLE-1 can be used as the raw material. These plastics have melting points of 300° C. or lower.

TABLE 1

| Plastic | Melting point (° C.) | Density | Boiling point (° C.) | Remarks |
|---|---|---|---|---|
| Polyethylene H | 120 to 140 | 0.94 to 0.96 | 180 to 380 | High Density |
| Polyethylene L | 122 to 124 | 0.92 to 0.94 | 130 to 250 | Straight-Chain, Low Density |
| Polypropylene | 167 to 170 | 0.90 to 0.91 | 180 to 380 | |
| Polystyrene | 230 | 1.05 | 180 to 360 | |
| polycarbonate | 46 to 300 | 1.2 | 130 to 390 | |

TABLE 1-continued

| Plastic | Melting point (° C.) | Density | Boiling point (° C.) | Remarks |
| --- | --- | --- | --- | --- |
| Nylon 6 | 225 | 1.13 | 260 to 380 | |
| Nylon 66 | 260 | 1.14 | 270 to 390 | |
| ABS Resin | | 1.03 to 1.11 | 250 to 380 | |
| Polyurethane | | 1.1 to 1.25 | 260 to 390 | Urethane Foam |
| Polyvinyl chloride H | | 1.36 to 1.54 | 180 to 350 | Hard |

In the liquefaction by heating as the first step of the reduction of solid plastics to produce oil, it is extremely difficult to melt these plastics according to a conventional method. It is essential how to efficiently heat plastics having a poor heat transfer characteristic. Accordingly, in the melting furnace 20 of the fourth embodiment, plastic 42 is efficiently heated by supplying a suitable amount of the plastic 42 to the heating medium 7 which is flowing at a high speed in the container 2 by being heated at 300° C. or higher.

Specifically, at an initial stage of the operation, the heating medium 7 such as light oil or kerosene is supplied and heated at 300° C. or higher. At this time, the heating medium 7 heated in the lower storage 11 is further heated in heat transferring pipes 14a of the first lateral section 12, thereby creating strong upward flows of the heating medium 7 in the heat transferring pipes 14a. In the entire container 2 is created a circulated flow of the heating medium 7 from the lower storage 11 to the first lateral section 12, to the upper storage 17, and to the second lateral section 13 in this order. In FIG. 7, this circulating direction is shown by solid-line arrows and the flow of the gas 4 is shown by broken-line arrows.

In this state, a suitable amount of finely cut waste plastic 42 as the raw material is supplied from a raw-material pouring portion 3. Specifically, an amount of trapped fluid in the container 2 is detected by a liquid level sensor 29 and the opening of a gate valve 3a is adjusted according to this detection result, whereby a suitable amount of the waste plastic 42 can be supplied to be efficiently molten. Since the waste plastic 42 poured from the raw-material pouring portion 3 is mixed with a large amount of the heating medium 7 heated to about 350° C. in the heat transferring pipe assembly 14 of the first lateral section 12 and flowing at a high flow rate toward the lower storage 11, it is immediately heated and liquefied. The heating medium 7 flows together with this liquefied plastic 42 and is further heated in the lower storage 11 and the first lateral section 12. In this way, light-oil components vaporize into vapors V to produce oil from the plastic 42.

Thus, according to the fourth embodiment, a natural circulation of the heating medium 7 can be created in the entire container 2, the solid plastic 42 can be efficiently molten, and the liquefaction by heating as the first step of the reduction of the plastic 42 to produce oil can be easily and securely performed.

The features of the fourth embodiment are as follows.

(1) The raw material contains solid components, which are heated to be molten by the above gas.

(2) The solid components include plastics. Accordingly, the present invention is applicable, for example, to melting furnaces for producing oils from waste plastics or the like.

(3) The heating and oil-producing method is such that the raw material contains solid components and the heating medium is heated to a temperature equal to or above the melting temperature of the solid components in the closed-loop lateral part.

Although the plastic 42 is poured as the raw material in the fourth embodiment, the present invention is not limited thereto. For example, a mixture of heavy oil such as crude and plastic may be poured as the raw material. Further, plastics other than those kinds of plastics shown in TABLE-1 are also applicable.

Although the inner heating section is constructed by a plurality of U-shaped pipes 26a in the fourth embodiment, it may be, instead, constructed by a plurality of straight heat transferring pipes as in the second embodiment. Further, instead of providing the heat transferring pipe assembly 14 comprised of a plurality of heat transferring pipes in the first lateral section 12, the first lateral section 12 may be constructed, for example, by a hollow cylindrical member and the heating medium 7 may flow therein without being divided as in the third embodiment.

Industrial Applicability

The present invention is applicable to melting furnaces and the like for producing oil from a raw material.

The invention claimed is:

1. A heating and oil-producing apparatus for heating a raw material poured into a container containing a heating medium through a raw-material pouring portion by gas flowing in a heated gas passage to vaporize at least part of the raw material, characterized in that:
    the container has a closed loop construction including a closed-loop lower part, a closed-loop lateral part extending upward from the closed-loop lower part and a circulating part communicating the closed-loop lateral part and the closed-loop lower part with each other, the closed-loop lower part, the closed-loop lateral part and the circulating part encircling a space so as to be capable of vertically circulating the heating medium;
    the heated gas passage includes a lower heating section for heating the heating medium in the closed-loop lower part and a lateral heating section for heating the heating medium in the closed-loop lateral part having ascended by being heated in the closed-loop lower part; and
    the raw-material pouring portion is disposed above the circulating part of the container so that the raw material is introduced to the heating medium flowing toward the closed-loop lower part by being heated in the closed-loop lateral part.

2. A heating and oil-producing apparatus according to claim 1, wherein:
    the lower heating section includes a plurality of heat transferring pipes arranged in the closed-loop lower part; and
    one end of each heat transferring pipe penetrates a side wall of the container so that the gas flows into the heat transferring pipe, whereas the other end thereof penetrates a side wall opposite to the former side wall to be connected with the lateral heating section.

3. A heating and oil-producing apparatus according to claim 1, wherein:
    the lower heating section includes a U-shaped pipe arranged in the closed-loop lower part; and
    one end of the U-shaped pipe penetrates a side wall of the container so that the gas flows into the U-shaped pipe, whereas the other end thereof penetrates the same side wall to be connected with the lateral heating section.

4. A heating and oil-producing apparatus according to claim 1, wherein the closed-loop lateral part includes a plurality of heat transferring pipes, and the heating medium heated in the closed-loop lower part flows into the respective heat transferring pipes.

5. A heating and oil-producing apparatus according to claim 1, wherein the raw material contains crude oil.

6. A heating and oil-producing apparatus according to claim 1, wherein the raw material contains solid components, and the solid components are heated by the gas to be molten.

7. A heating and oil-producing apparatus according to claim 6, wherein the solid components contain plastic.

8. A heating and oil-producing apparatus according to claim 1, wherein at least one of a catalyst tank for causing the raw material vaporized in the container to react and a fractionating column for fractionating the raw material vaporized in the container is connected with the upper end of the closed-loop lateral part.

9. A heating and oil-producing apparatus according to claim 1, further comprising liquid level detecting means for detecting the liquid level of the heating medium.

10. A heating and oil-producing apparatus according to claim 1, further comprising a discharge pipe for discharging components remaining in the container.

11. A heating and oil-producing method comprising the steps of pouring a raw material into a container containing a heating medium, and heating the raw material by gas to vaporize at least a part of the raw material, characterized in that:
   a container constructed to have such a closed loop shape including a closed-loop lower part, a closed-loop lateral part extending upward from the closed-loop lower part and a circulating part communicating the closed-loop lateral part and the closed-loop lower part with each other, the closed-loop lower part, the closed-loop lateral part and the circulating part encircling a space such that the heating medium can be vertically circulated is used,
   the heating medium is heated by the gas in the closed-loop lower part and the heating medium having ascended by being heated is further heated by the gas in the closed-loop lateral part, and
   the raw material is introduced to the circulating part where the heating medium heated in the closed-loop lateral part is flowing downward toward the closed-loop lower part.

12. A heating and oil-producing method according to claim 11, wherein the raw material contains solid components and the heating medium is heated to or above the melting temperature of the solid components in the closed-loop lateral part.

13. A heating and oil-producing apparatus for heating a raw material with a heating medium that has been heated sufficiently by a heated gas to vaporize at least part of the raw material, the apparatus comprising: an
   a container for containing the heating medium and for receiving the raw material, the container having a lower part with opposite first and second ends, a lateral part having a plurality of pipes extending up from the second end of the lower part and a circulating part for providing communication between an upper end of the lateral part and the first end of the lower part to define a closed loop encircling a space and vertically circulating the heating medium, a raw material pouring portion communicating with the circulating part for receiving the raw material;
   a heated gas passage including a lower heating section for heating the heating medium in the lower part of the closed-loop and a lateral heating section for further heating of the heating material that has ascended from the lower part of the closed loop into the pipes of the lateral part of the closed-loop.

14. A heating and oil-producing apparatus according to claim 13, wherein the lower heating section includes a plurality of heat transferring tubes arranged in the lower part of the closed-loop, each of the heat transferring tubes having a first end that penetrates a first side wall of the container so that the gas flows into the heat transferring tubes, each of the heat transferring tubes further having a second end that penetrates a second side wall opposite to the first side wall to be connected with the lateral heating section.

15. A heating and oil-producing apparatus according to claim 13, wherein the lower heating section includes at least one U-shaped pipe arranged in the lower part of the closed-loop, the U-shaped pipe having first and second ends, the first end penetrating a side wall of the container so that the gas flows into the U-shaped pipe, the second end penetrating the side wall and being connected with the lateral heating section.

* * * * *